United States Patent
Leng

(10) Patent No.: US 6,321,784 B1
(45) Date of Patent: Nov. 27, 2001

(54) OIL-STORING DEVICE FOR A BIKE SAUCER-BRAKE

(76) Inventor: Tony Leng, No. 68, Lane 60, Guang Ming South Road, Nan Tou City, Nan Tou Hsien (TW)

(*) Notice: Subject to any disclaimer, the term of this patent is extended or adjusted under 35 U.S.C. 154(b) by 0 days.

(21) Appl. No.: 09/671,315

(22) Filed: Sep. 28, 2000

(51) Int. Cl.⁷ ..................................................... F16L 55/00
(52) U.S. Cl. .............................................. 137/571; 138/30
(58) Field of Search ................................ 138/30; 137/571

(56) References Cited

U.S. PATENT DOCUMENTS

| | | | |
|---|---|---|---|
| 4,610,369 | * | 9/1986 | Mercier .................................. 138/30 |
| 4,732,176 | * | 3/1988 | Sagimura ............................... 138/30 |
| 5,443,139 | * | 8/1995 | Scott ................................... 184/15.2 |
| 5,709,248 | * | 1/1998 | Goloff .................................... 138/30 |

* cited by examiner

Primary Examiner—A. Michael Chambers
(74) Attorney, Agent, or Firm—Dougherty & Troxell

(57) ABSTRACT

An oil-storing device for a bike saucer-brake includes two oil-storing chambers formed in an interior of a grip, a plate separating the two oil-storing chambers. The plate has a hole communicating two oil-storing chambers for brake oil to flow through. Further, an oil delivery pipe is provided inserting into an outlet tubular portion of the grip, extending inward to reach on the plate, communicating with either of the two oil storing chambers through a sucking hole. Thus, the two oil-storing chambers can store more oil, sucking in oil back to prevent snap locking of the brake from happening. Therefore the device insures safety of a rider in riding even if a bike inclines.

3 Claims, 4 Drawing Sheets

OIL-STORING DEVICE FOR A BIKE SAUCER-BRAKE

BACKGROUND OF THE INVENTION

This invention relates to an oil-storing device for a bike saucer-brake, particularly to one possible to keep oil supply stable, and prevent the brake from snap locking.

A conventional oil storing device for a bike saucer-brake includes an oil storing chamber with an open top, assembled together with a handle, and having a cover fixed on its top surface to form a closed hollow chamber. And then an oil delivery pipe is with one side of the oil-storing chamber.

In accordance with the conventional oil-storing device mentioned above, it consists of only one oil-storing chamber with a small capacity, and if the handle body is slantingly disposed on a bike body, the oil-storing chamber is also slant. So brake oil may merely stay in one side portion of the oil storing chamber, and subsequently the sucking hole may suck air instead of brake oil, then, the brake may fail to function.

In addition, in high temperature brake oil may inflate to flow back, but due to the small capacity of the oil storing chamber, the space in the chamber is not sufficient for flowing-back oil to stay in, resulting in snap locking of the brake, and safety in riding a bike is not secured.

SUMMARY OF THE INVENTION

The objective of the present invention is to offer an oil-storing device for a bike saucer-brake, possible to store more oil, to stabilize oil supply, and to prevent a brake from snap locking.

One feather of the invention is two oil storing chambers formed in an upper and a lower portion of a grip, and separated by a plate, and the plate has a hole bored therethrough to enable brake oil in the two oil storing chambers to flow from one of the chambers to the other chamber.

Another feature of the invention is an oil delivery pipe inserted into an outlet tubular portion of the grip and extending to on the plate and connected with either of the oil storing chambers through a sucking hole. The device can not only store more oil in the oil-storing chamber, but also suck back brake oil when temperature is high enough to let brake oil inflate. Hence, snap locking of the brake can be avoided owing to normal oil supply, and safety of a rider can be secured in riding.

BRIEF DESCRIPTION OF THE DRAWINGS

This invention will better understood by referring to the accompanying drawings, wherein.

DETAILED DESCRIPTION OF THE PREFERRED EMBODIMENT

Figure 1:
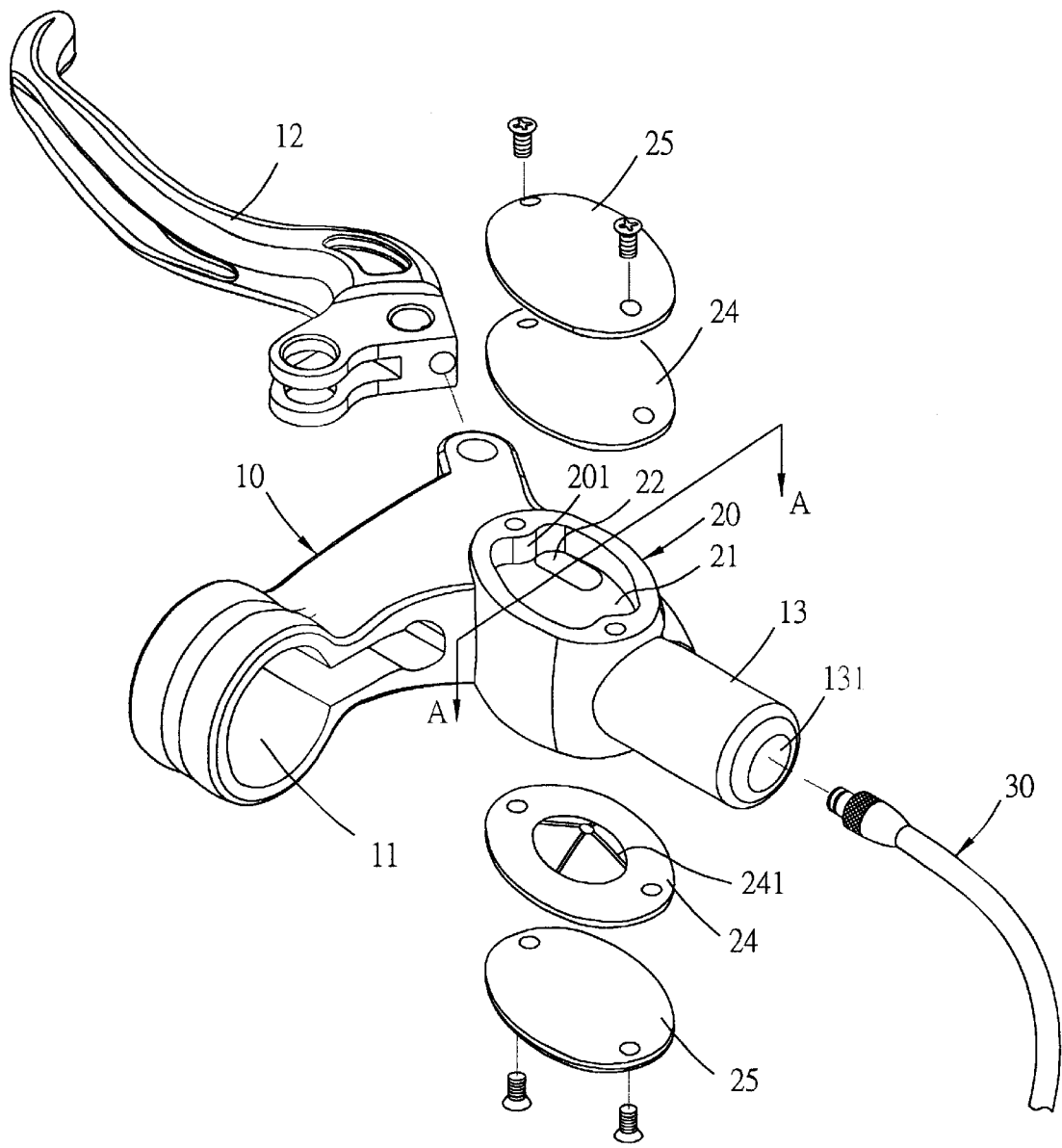
FIG. 1 is an exploded perspective view of an oil-storing device for a bike saucer-brake in the present invention.
Figure 2:
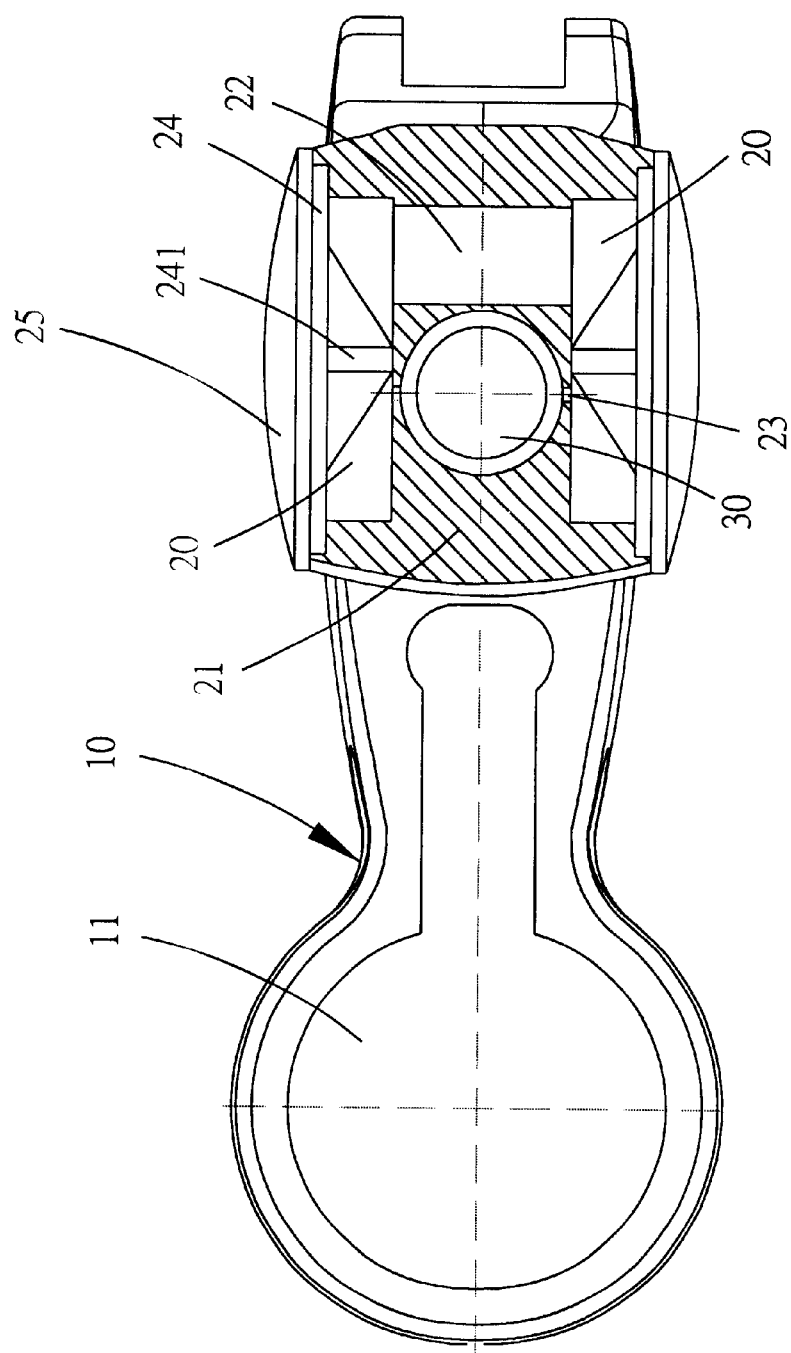
FIG. 2 is a side cross-sectional view along II—II of FIG. 1.

A preferred embodiment of an oil-storing device for a bike saucer-brake in the present invention, as shown in FIGS. 1 and 2, includes a grip 10, two oil-storing chambers 20 and an oil delivery pipe 30 as main components combined together.

The grip 10 is pivotally connected with a handle of a bike by means of a pivotal hole 11, having one end pivotally connected with a brake lever 12, and the other end connected with an outlet tubular portion 13 having a connect hole 131 in its central portion.

The two oil storing chambers 20 are formed in both an upper and a lower portion of the grip 10, and separated by a plate 21 having a hole 22 communicating two oil storing chambers with each other. Then, a rubber cover 24 and a protective cover 25 are in order closed respectively on an open upper side 201 and an open lower side 201 of the oil-storing chamber 20, and each rubber cover 24 has plural ribs 241 set to protrude in the oil-storing chambers 20.

The oil delivery pipe 30 is connected to one side of the grip body 10 through the joint hole 131 of the outlet tube 13, extending inward to the plate 21, and communicating with the lower oil storing chamber 20 by means of a sucking hole 23 formed in a bottom of the plate 21.

Figure 3:
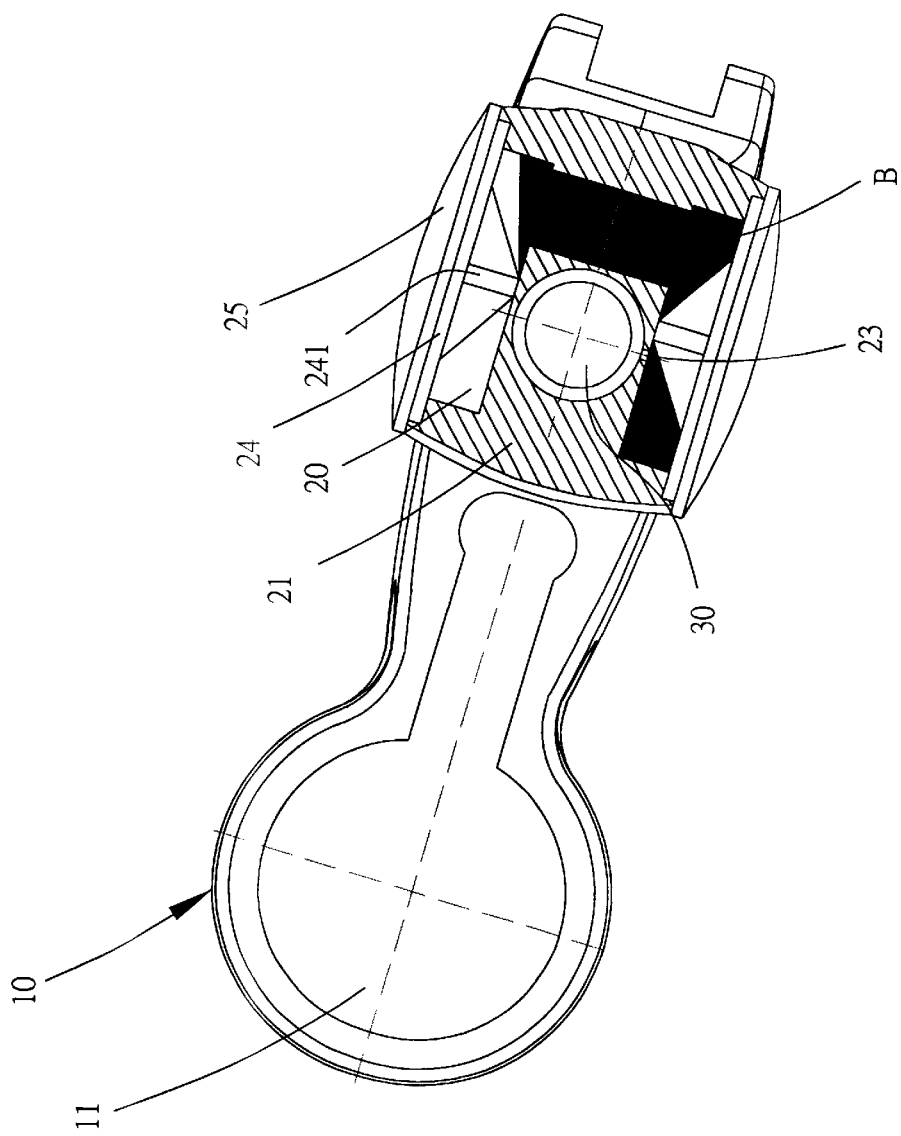
FIG. 3 is a side cross-sectional view of a grip in a slanting position in the present invention: and, FIG. 4 is a side cross-sectional view of the brake oil inflated in oil storing device in the present invention.

Next, the function of the oil-storing device for a bike saucer-brake is to be described. As shown in FIG. 3, the sucking hole 23 is positioned at the bottom of the plate 21 so that when the grip 10 is slantingly secured to the handle of a bike, brake oil B will flow downward through the hole of the plate 21, and be stored in the lower oil-storing chamber 20. As the sucking hole 23 is located in the bottom of the plate 21, brake oil B will normally remain around the sucking hole 23, even if brake oil B in the chamber becomes little. Thus, the device greatly reduces possibility that the sucking hole 23 may suck air, surely preventing the brake from losing function.

Figure 4:
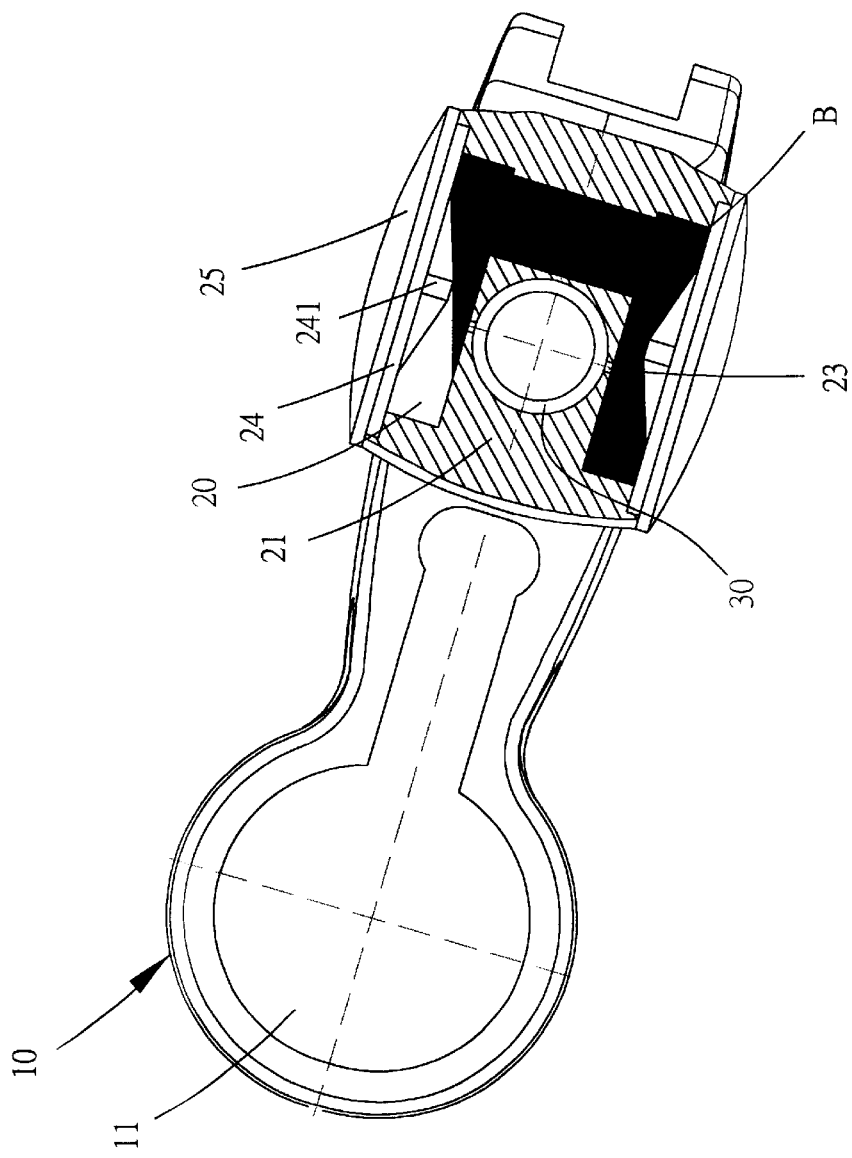

In addition, as shown in FIG. 4, one side surface of the rubber cover 24, facing the oil-storing chamber 20, has a recessed shape with plural rib 241. The rubber cover 24 is made of soft and resilient rubber, having the recessed shape towards the oil-storing chambers 20 so that when brake oil reduces, the rubber cover 24 properly presses brake oil B to the interior of the oil storing chambers 20, preventing the sucking hole from sucking air. Besides, when the rubber covers 24 actuates to press brake oil B, the ribs 241 of the rubber covers 24 can prevent the covers 24 from deforming and then the parts of the device from wearing off.

While the preferred embodiments of the invention have been described above, it may be recognized and understood that various modifications may be made therein and the appended claims are intended to cover all such modifications that may fall within the spirit and scope of the invention.

What is claimed is:

1. An oil-storing device for a bike having a bike brake for storing and stabilizing brake oil and preventing the bike brake from snap-locking, comprising:
   a grip connectable to a handle of the bike;
   a first oil-storing chamber formed in an upper portion of the grip;
   a second oil-storing chamber formed in a lower portion of the grip;
   a plate between the first oil-storing chamber and the second oil-storing chamber and having: a first hole therein communicating with the first and second oil-storing chambers enabling brake oil to flow back and forth between the first oil-storing chamber and the second oil-storing chamber; an oil-delivery pipe; and a second hole communicating with the oil-delivery pipe and the second oil-storing chamber enabling brake oil to flow back and forth between the oil-delivery pipe and the second oil-storing chamber; and, at least one rubber cover attached to the grip having resilient ribs extending into at least one of first and second oil-storing chambers, whereby the ribs are deformable to accommodate brake oil entering the first and second oil storing chambers from the oil delivery pipe through the second hole to thereby prevent the bike brake from snap-locking.

2. The oil-storing device of claim 1, wherein the second hole is formed in a bottom of the plate.

3. The oil-storing device of claim 1, wherein the at least one rubber cover comprises a first rubber cover and a second rubber cover, having a plurality of ribs thereon extending into the first and second oil-storing chambers, respectively.

* * * * *